United States Patent
Cheng et al.

(10) Patent No.: US 10,693,321 B2
(45) Date of Patent: Jun. 23, 2020

(54) INDUCTIVE POWER TRANSFER USING DIVERTED MAGNETIC FIELD

(71) Applicant: THE HONG KONG POLYTECHNIC UNIVERSITY, Hong Kong (CN)

(72) Inventors: Ka Wai Eric Cheng, Hong Kong (CN); Manxin Chen, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 38 days.

(21) Appl. No.: 16/192,946

(22) Filed: Nov. 16, 2018

(65) Prior Publication Data
US 2019/0157906 A1  May 23, 2019

Related U.S. Application Data

(60) Provisional application No. 62/587,546, filed on Nov. 17, 2017.

(51) Int. Cl.
*H02J 50/10* (2016.01)
*H01F 27/24* (2006.01)
(Continued)

(52) U.S. Cl.
CPC ............... *H02J 50/10* (2016.02); *H01F 3/10* (2013.01); *H01F 27/24* (2013.01); *H01F 38/14* (2013.01);
(Continued)

(58) Field of Classification Search
CPC ... H02J 50/10; H02J 3/46; H02J 50/40; H01F 3/10; H01F 27/24; H01F 38/14; H01F 2003/106
See application file for complete search history.

(56) References Cited

U.S. PATENT DOCUMENTS

2017/0018947 A1 * 1/2017 Chien .................. H02J 7/025

OTHER PUBLICATIONS

L. C. Meng, K. W. Eric Cheng, and K. W. Chan, "Systematic Approach to High-Power and Energy-Efficient Industrial Induction Cooker System: Circuit Design, Control Strategy and Prototype Evaluation", IEEE Transactions on Power Electronics, vol. 26, No. 12, pp. 3754-3765, Dec. 2011.
(Continued)

*Primary Examiner* — Carlos Amaya
(74) *Attorney, Agent, or Firm* — Spruson & Ferguson (Hong Kong) Limited (57) ABSTRACT

In a wireless power transfer (WPT) system, a power-transmitting unit has a loop-shaped magnetic core formed by alternately arranging high-permeability (HP) and low-permeability (LP) core sections to give an interleaving pattern. A primary coil wound on the magnetic core provides a magnetic flux traveling therein when excited by an AC power source. A power-receiving unit has a pickup core shaped and dimensioned to overlie one or any LP core section, and to partially overlap HP core sections immediately adjacent to the LP core section that is overlay. The pickup core has a relative permeability higher than that of the aforesaid LP core section, causing at least a part of the magnetic flux to divert from this LP core section to the pickup core. The diverted part of magnetic flux generates electrical power in a secondary pickup coil wound on the pickup core to achieve WPT.

18 Claims, 5 Drawing Sheets

(51) Int. Cl.
    *H02J 3/46*     (2006.01)
    *H01F 38/14*     (2006.01)
    *H01F 3/10*     (2006.01)
    *H02J 50/40*     (2016.01)

(52) U.S. Cl.
    CPC .......... *H02J 3/46* (2013.01); *H01F 2003/106* (2013.01); *H02J 50/40* (2016.02)

(56) References Cited

OTHER PUBLICATIONS

D. Mishra, S. De, and K. R. Chowdhury, "Charging Time Characterization for Wireless RF Energy Transfer", IEEE Transactions on Circuits and Systems II: Express Briefs, vol. 62, issue 4, pp. 362-366, 2015.

J. Madawala and D. Thrimawithana, "A Bidirectional Inductive Power Interface for Electric Vehicles in V2G Systems," IEEE Transactions on Industrial Electronics, vol. 58, No. 10, pp. 4789-4796, Oct. 2011.

C. J. Chen, T. H. Chu, C. L. Lin, and Z. C. Jou, "A Study of Loosely Coupled Coils for Wireless Power Transfer," IEEE Transactions on Circuits and Systems, vol. 57, No. 71, pp. 536-540, Jul. 2010.

D. Ahn and S. Hong. "Effect of Coupling Between Multiple Transmitters or Multiple Receivers on Wireless Power Transfer," IEEE Transactions on Industrial Electronics, vol. 60, No. 7, pp. 2602-2613, Jul. 2013.

S. Y. Hui, "Planar Wireless Charging Technology for Portable Electronic Products and Qi", Proceedings of the IEEE, vol. 101, issue 6, pp. 1290-1301, 2013.

X. Mou, O. Groling, and H. Sun, "Energy-Efficient and Adaptive Design for Wireless Power Transfer in Electric Vehicles", IEEE Transactions on Industrial Electronics, vol. 64, issue 9, pp. 7250-7260, 2017.

\* cited by examiner

INDUCTIVE POWER TRANSFER USING DIVERTED MAGNETIC FIELD

CROSS-REFERENCE TO RELATED APPLICATION

This application claims the benefit of U.S. Provisional Patent Application No. 62/587,546, filed on Nov. 17, 2017, the disclosure of which is incorporated by reference herein in its entirety.

LIST OF ABBREVIATIONS

AC alternating current
HP high-permeability
LP low-permeability
WPT wireless power transfer

BACKGROUND

Field of the Invention

The present invention relates to a WPT system using induction and capable of providing multiple electrical power outputs from the same magnetic flux source. The technical field is in the area of WPT using magnetic induction under the near field instead of the radio field.

List of References

There follows a list of references that are occasionally cited in the specification. Each of the disclosures of these references is incorporated by reference herein in its entirety.
[1] L. C. Meng, K. W. Eric Cheng, and K. W. Chan, "Systematic Approach to High-Power and Energy-Efficient Industrial Induction Cooker System: Circuit Design, Control Strategy and Prototype Evaluation", *IEEE Transactions on Power Electronics*, vol. 26, no. 12, pp. 3754-3765, December 2011.
[2] Deepak Mishra, Swades De, and Kaushik R. Chowdhury, "Charging Time Characterization for Wireless RF Energy Transfer", *IEEE Transactions on Circuits and Systems II: Express Briefs*, vol. 62, issue 4, pp. 362-366, 2015.
[3] U. Madawala and D. Thrimawithana, "A Bidirectional Inductive Power Interface for Electric Vehicles in V2G Systems," *IEEE Transactions on Industrial Electronics*, vol. 58, no. 10, pp. 4789-4796, October 2011.
[4] C. J. Chen, T. H. Chu, C. L. Lin, and Z. C. Jou, "A Study of Loosely Coupled Coils for Wireless Power Transfer," *IEEE Transactions on Circuits and Systems*, vol. 57, no. 71, pp. 536-540, July 2010.
[5] D. Ahn and S. Hong, "Effect of Coupling Between Multiple Transmitters or Multiple Receivers on Wireless Power Transfer," *IEEE Transactions on Industrial Electronics*, vol. 60, no. 7, pp. 2602-2613, July 2013.
[6] S. Y. Hui, "Planar Wireless Charging Technology for Portable Electronic Products and Qi", *Proceedings of the IEEE*, vol. 101, issue 6, pp. 1290-1301, 2013.
[7] Xiaolin Mou, Oliver Groling, and Hongjian Sun, "Energy-Efficient and Adaptive Design for Wireless Power Transfer in Electric Vehicles", *IEEE Transactions on Industrial Electronics*, vol. 64, issue 9, pp. 7250-7260, 2017.

Description of Related Art

Electric power transfer based on conductors is a conventional method. Recently, the use of WPT provides an alternative method that can be classified into the near-field power transfer and the far-field power transfer. The near-field power transfer is usually via magnetic induction similar to operating a transformer, and the power is transferred from the primary side to the secondary side through an air gap. A similar technology is the induction heating or heating cooker (L. C. MENG, K. W. E. CHENG, and K. W. CHAN, "Systematic Approach to High-Power and Energy-Efficient Industrial Induction Cooker System: Circuit Design, Control Strategy and Prototype Evaluation", *IEEE Transactions on Power Electronics*, vol. 26, no. 12, pp. 3754-3765, Dec. 2011). The far-field power transfer is based on the use of radio wave. The power is transmitted through air or vacuum space by electromagnetic radiation and the receiver is operated similar to a radio receiver to receive the power transferred from the transmitter (D. MISHRA, S. DE, and K. R. CHOWDHURY, "Charging Time Characterization for Wireless RF Energy Transfer", *IEEE Transactions on Circuits and Systems II: Express Briefs*, vol. 62, issue 4, pp. 362-366, 2015). As the power transfer is closely related to the distance between the source and the load (or the output), the former one usually has a higher efficiency of power transfer.

The latter power transfer approach is similar to radio power and because the efficiency is low, it is not discussed here. The former one is like a near distance magnetic field transfer. Therefore, the conventional design is still based on a transformer. Various methods have been used (U. MADAWALA and D. THRIMAWITHANA, "A Bidirectional Inductive Power Interface for Electric Vehicles in V2G Systems," *IEEE Transactions on Industrial Electronics*, vol. 58, no. 10, pp. 4789-4796, Oct. 2011; C. J. CHEN, T. H. CHU, C. L. LIN, and Z. C. JOU, "A Study of Loosely Coupled Coils for Wireless Power Transfer," *IEEE Transactions on Circuits and Systems*, vol. 57, no. 71, pp. 536-540, Jul. 2010). Most of them are concerned with one-to-one power transfer, but multiple coils can also be used to pick up power [5]. Therefore, for high-efficiency power transfer and when there are many outputs, current technology has difficulty to provide such skills.

Even one may use a large primary coil to couple to a few secondary coils, the leakage is significant and the overall efficiency is poor. When the leakage is significant, the adverse effect to nearby people and animals becomes a concern. Another approach is to use many primary coils and one or a few secondary coils to provide WPT (S. Y. HUI, "Planar Wireless Charging Technology for Portable Electronic Products and Qi", *Proceedings of the IEEE*, vol. 101, issue 6, pp. 1290-1301, 2013; X. MOU, O. GROLING, and H. SUN, "Energy-Efficient and Adaptive Design for Wireless Power Transfer in Electric Vehicles", *IEEE Transactions on Industrial Electronics*, vol. 64, issue 9, pp. 7250-7260, 2017), but this method still needs a large coverage of primary coils and the secondary coil pickup requires good and accurate magnetic design to receive the magnetic energy. Although the efficiency may not be important for low-power applications as these applications are to provide low power battery charging, it does matter for high-power applications. When there are high-power applications such as tens or hundreds of watts or even higher, the results have not been reported.

There is a need in the art to have an improved WPT technique that achieves a high power-transfer efficiency for an application that requires transfer of high power. Such technique is advantageous for many practical applications, such as wireless charging of an electric vehicle.

SUMMARY OF THE INVENTION

In the present invention, a novel magnetic topology design for facilitating WPT from a single primary coil to one or more secondary circuits is provided. A WPT system employing such design is disclosed.

The disclosed WPT system comprises at least one power-transmitting unit and at least one power-receiving unit.

An individual power-transmitting unit comprises a loop-shaped magnetic core and a primary coil. The magnetic core comprises one or more HP core sections and one or more LP core sections. The one or more HP core sections has a relative permeability higher than a relative permeability of the one or more LP core sections. In particular, all the HP and LP core sections are alternately arranged to form an interleaving pattern in forming the magnetic core. The primary coil is wound on the magnetic core for generating a magnetic flux in the magnetic core upon the primary coil being excited by an AC power source.

An individual power-receiving unit comprises a pickup core and a secondary pickup coil. The pickup core is configured at least in shape and dimension to overlie a first LP core section selected from the one or more LP core sections. The first LP core section connects to two connecting surfaces of respective one or two HP core sections immediately adjacent to the first LP core section. Furthermore, the pickup core is further configured at least in shape and dimension to partially overlap said respective one or two HP core sections around the two connecting surfaces. The pickup core has a relative permeability higher than the relative permeability of the first LP core section, causing at least a part of the magnetic flux to divert from the first LP core section to the pickup core when the individual power-receiving unit is parked adjacent to the individual power-transmitting unit such that the pickup core overlies the first LP core section and partially overlaps said respective one or two HP core sections. The secondary pickup coil is wound on the pickup core for inductively generating electrical power from the diverted part of magnetic flux, enabling electrical power supplied by the AC power source to be wirelessly delivered to the individual power-receiving unit.

Preferably, the primary coil is wound on a predetermined HP core section selected from the one or more HP core sections. The primary coil may also be wound on a predetermined LP core section selected from the one or more LP core sections.

The primary coil may be made of copper or other conductor.

In one embodiment, the one or more LP core sections consist of plural identical LP core sections. The first LP core section is selected to be any one of the identical LP core sections such that the pickup core of the individual power-receiving unit is enabled to park on any one of the identical LP core sections for wirelessly receiving electrical power from the AC power source.

Usually, the relative permeability of an individual HP core section is at least 400, preferably from 500 and 5000 or even higher. Generally, the relative permeability of an individual LP core section is at most 500, preferably in a range of 5 to 200.

In certain embodiments, the disclosed WPT system further comprises the AC power source. The AC power source may be configured to supply a sine wave or a square wave to the primary coil. Preferably, the AC power source has a working frequency of 20 kHz or above.

In performing WPT by positioning the pickup core to overlie the first LP core section and to partially overlap said respective one or two HP core sections, the first LP core section may be separated from the pickup core by the air gap of length between 0.05 mm to 3 cm, or by the air gap of length within 0.1% to 10% of a length of the pickup core.

According to one embodiment of the disclosed WPT system, there are plural HP core sections and plural LP core sections in the individual power-transmitting unit. As such, the pickup core in the individual power-receiving unit is configured to overlie the first LP core section and to partially overlap two HP core sections immediately adjacent to the first LP core section.

Other aspects of the present invention are disclosed as illustrated by the embodiments hereinafter.

BRIEF DESCRIPTION OF THE DRAWINGS

FIG. 3 depicts, as one embodiment of the present invention, a WPT system having a power-transmitting unit equipped with four LP core sections so that there are four ports available for a power-receiving unit to park on.

DETAILED DESCRIPTION

According to the present invention, a novel magnetic topology design is provided for facilitating WPT from a single primary coil to one or more secondary circuits. Particularly, a WPT system employing such design is disclosed. The disclosed WPT system is advantageously useful for achieving a high power-transfer efficiency for an application that requires wireless transfer of high power. Nonetheless, the present invention is not limited only for high-power WPT applications; the present invention is also usable for low-power WPT applications. Although the disclosed WPT system can be advantageously used when the system provides many electrical-power output ports, the present invention is not limited to a general case of providing more-than-one output ports; the present invention is also applicable to a specific case of providing one output port.

Figure 1:
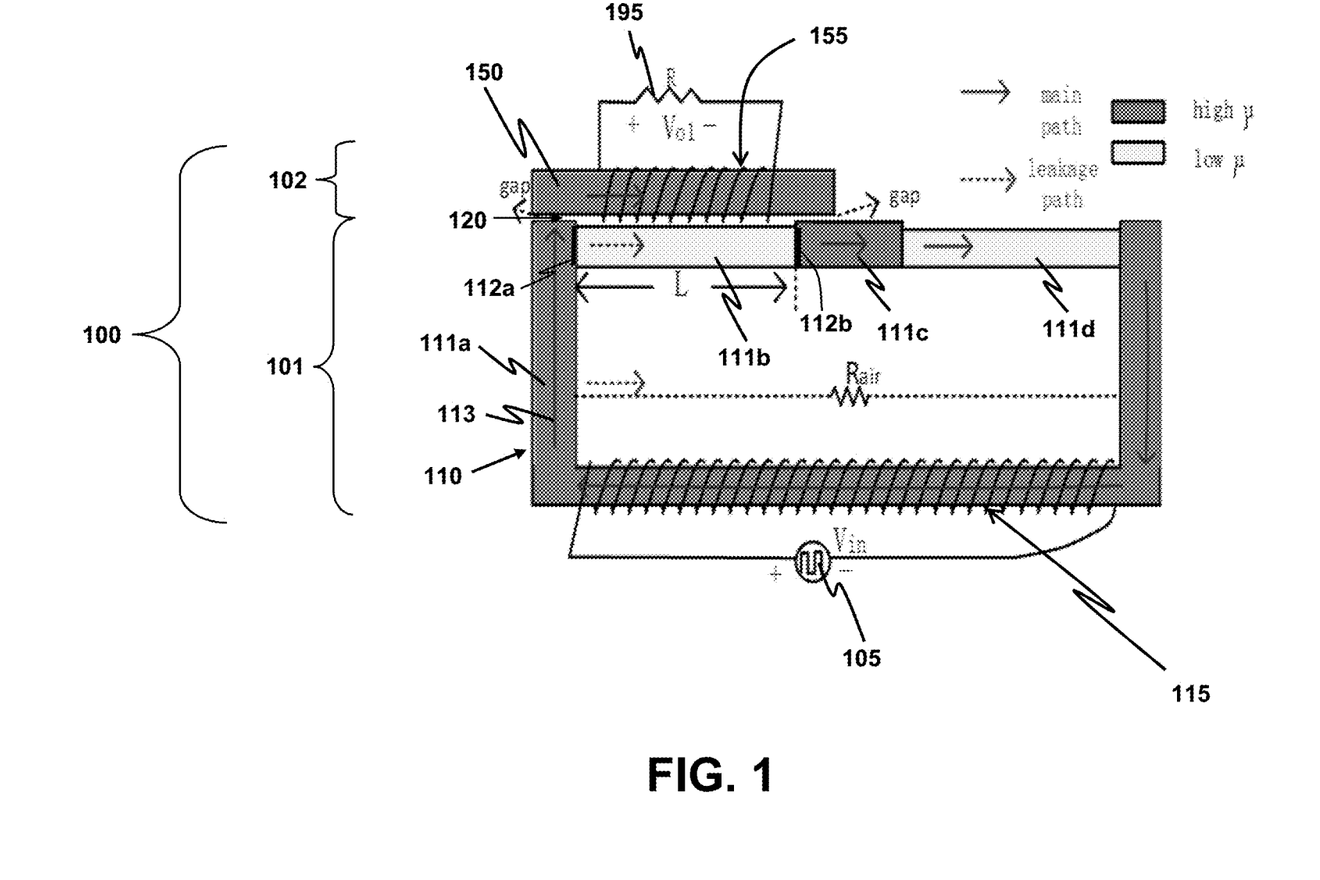
FIG. 1 depicts an exemplary design of a WPT system as disclosed herein.

The disclosed WPT system is illustrated with the aid of FIG. 1. FIG. 1 depicts an exemplary WPT system 100 for wirelessly transmitting electrical power from an AC power source 105 to a load 195 through an air gap 120. In the system 100, the approach of near-field power transfer is used. The system 100 is configured to be similar to a transformer. Power is transferred from a primary coil 115, which is excited by the AC power source 105, to a secondary pickup coil 155, which is connected to and thereby drives the load 195, via magnetic induction. Operationally, the system 100 comprises a power-transmitting unit 101 for generating a magnetic flux 113 upon excitation by the AC power source 105, and a power-receiving unit 102 for drawing at least a part of the magnetic flux 113 from the power-transmitting unit 101 to inductively generate an electrical power. The generated electrical power is deliverable to the load 195 to achieve WPT.

The power-transmitting unit 101 comprises a magnetic core 110 and the primary coil 115. The magnetic core 110 is used to guide traveling of the magnetic flux 113 produced by the primary coil 115 upon excitation by the AC power source 105. The magnetic core 110 is realized as a closed-circuit magnetic loop, and is hence a loop-shaped magnetic core. The magnetic core 110 is wound with the primary coil 115 for receiving the magnetic flux 113 produced therefrom. In particular, the magnetic core 110 comprises plural core sections (or segments) 111a-d. The core sections 111a-d are sequentially arranged and integrated to form the closed-circuit magnetic loop. The core sections 111a-d are classified into two types of core sections according to their relative permeability values. Each type of core sections is uniquely identified by having a same relative permeability. For example, core sections of one type are made of a certain material or composite having a certain relative permeability. In another example, core sections belonging to one type are made of different materials but these different materials have the same nominal value of relative permeability as reported by manufacturers of these different materials. Among the core sections 111a-d, the core sections 111a and 111c belong to one type and the core sections 111b and 111d belong to another type. In particular, the relative permeability of the core sections 111a and 111c is higher than the relative permeability of the core sections 111b and 111d. Hence, hereinafter the core sections 111a and 111c are referred to as HP core sections, and the core sections 111b and 111d are referred to as LP core sections. Note that all the HP core sections 111a, 111c and the LP core sections 111b, 111d are alternately arranged to form an interleaving pattern such that each of the HP core sections 111a, 111c is end-to-end connected to two of the LP core sections 111b, 111d, and vice versa.

It is desired to wirelessly receive power from the magnetic core 110 through magnetic induction to drive the load 195. The power-receiving unit 102 achieves this WPT function by including a pickup core 150, which is a segment of material having a high relative permeability, and the secondary pickup coil 155. In particular, the relative permeability of the pickup core 150 is higher than the relative permeability of the LP core sections 111b, 111d. Without loss of generality, consider a representative situation that the pickup core 150 is positioned to overlie the LP core section 111b and to partially overlap the two HP core sections 111a, 111c (both of which are immediately adjacent to the aforesaid LP core section 111b). In this regard, a requisite is that the pickup core 150 is at least shaped and dimensioned to overlie the LP core section 111b and to partially overlap the two HP core sections 111a, 111c. Note that the LP core section 111b connects to a first connecting surface 112a and a second connecting surface 112b of the two immediately-adjacent HP core sections 111a, 111c, respectively. As used herein in the specification and appended claims, a connecting surface of a core section is a surface that connects to another core section immediately adjacent to the former core section. The pickup core 150 is further arranged such that the two immediately-adjacent HP core sections 111a, 111c are partially overlapped respectively around the first and second connecting surfaces 112a, 112b. Since the pickup core 150 has a higher relative permeability than the LP core section 111b does, and since the pickup core 150 partially overlaps the two HP core sections 111a, 111c around their respective connecting surfaces 112a, 112b, a part of the magnetic flux 113 in the magnetic core 110 is diverted from the LP core section 111b to the pickup core 150. Particularly, the part of the magnetic flux 113 is drawn from the magnetic core 110 to passing through the pickup core 150 via the air gap 120. An ideal scenario is that an entire amount of the magnetic flux 113 is diverted to the pickup core 150. In practice, it is desirable to optimize the design of the system 100 so as to have a substantial part of the magnetic flux 113 to be received by the pickup core 150. For instance, the air gap 120 may be kept as short as possible by means of appropriate alignment techniques (e.g., US2016/0001669 and US2017/0259680), and the pickup core 150 may be formed by a material having a much higher relative permeability than the LP core section 111b. The pickup core 150 is wound with the secondary pickup coil 155. The magnetic flux 113 traveling inside the pickup core 150 produces a voltage at the secondary pickup coil 155 via induction. The induced voltage is used to drive the load 195, thereby achieving WPT from the AC power source 105 to the load 195.

The theory that supports the realization of WPT by the system 100 is elaborated as follows.

Figure 2:
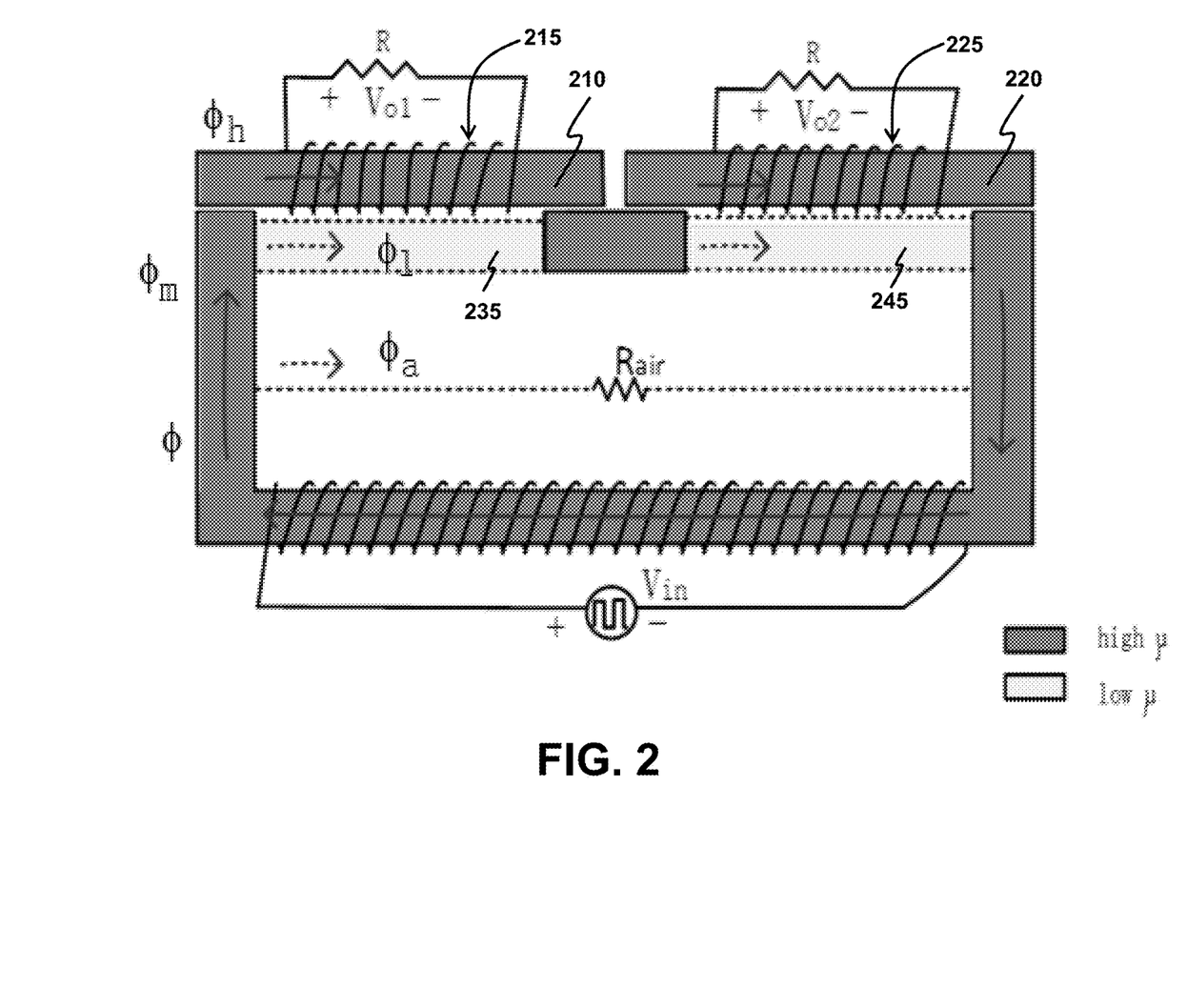
FIG. 2 depicts, as an illustration, a situation that a magnetic path having two loads, showing how the main flux is divided into two paths through a LP core section and a pickup core having a relative permeability higher than that of the LP core section.

Refer to FIG. 2, which shows a magnetic path having two pickup cores 210, 220 overlying two LP core sections 235, 245, respectively. Based on Ampere circuital law, the magnetic path consisting of a flux $\phi$ passing through a loop satisfies $$\oint B \cdot dl = \mu_0 \iint_S J \cdot ds$$

where B is the magnetic field density of the magnetic circuit, l is the magnetic path length, J is the current density of the excited current and S is the area of the current excited in the circuit. The right hand side of the aforementioned equation defines the current excited in the circuit. The left hand side defines the enclosed magnetic field in the closed circuit path. Because of the leakage of air, a portion of the magnetic flux is channeled to the air (denoted as $\phi_a$). The remaining flux, given by $\phi_m = \phi - \phi_a$, is then divided into two paths. One path is a HP path (e.g., via the pickup core 210) and the other path is a LP path (e.g., via the LP core section 235. The HP path has a magnetic flux $\phi_h$ and the LP path has a magnetic flux $\phi_l$.

If the pickup core 210 has a reluctance of $R_h$ and the LP core section 235 has a reluctance of $R_l$, the magnetic flux $\phi_m$ is divided into two paths of $\phi_h$ and $\phi_l$ according to the magnetic flux sharing, which is in turn according to the reluctance values. The reluctance can be measured or calculated according to the magnetic section property. In short, it is given by $$R = \frac{L}{\mu_r A_e \mu_0}$$

where R, the reluctance, depends on the dimension and physical parameters of a section such that L is the length of the section, and $A_e$ is the cross-sectional area of the section.

The magnetic flux received by the pickup core 210 is transformed into electric energy by $$\oint E \cdot dl = -\int \frac{\partial B}{\partial t} \cdot dA$$

where E is the electric field induced in the secondary side, l is the displacement and A is the area of the magnetic path concerned. The left hand side gives the voltage induced in a coil 215 wound on the pickup core 210, and the right hand side gives the change of magnetic flux $\phi_h$. For a high frequency switching circuit, the frequency of the primary current is to provide the rate of change of the flux.

The sharing of magnetic flux $\phi_m$ among the pickup core 220 and the LP core section 245 and the generation of voltage at a coil 225 that winds on the pickup core 220 are similar to the previous case for the pickup core 210 and the LP core section 235.

The WPT system 100 may be extended to give a variety of different implementations adapted to practical situations. Different configurations of the disclosed WPT system are elaborated as follows.

Refer to FIG. 1. Each of the LP core sections 111b, 111d may serve as an individual port on which the power-receiving unit 102 is parked so as to wirelessly receive power from the power-transmitting unit 101. Although FIG. 1 depicts that the power-transmitting unit 101 provides two ports, a power-transmitting unit may be equipped with any positive number of ports as long as practically implementable.

Figure 3:
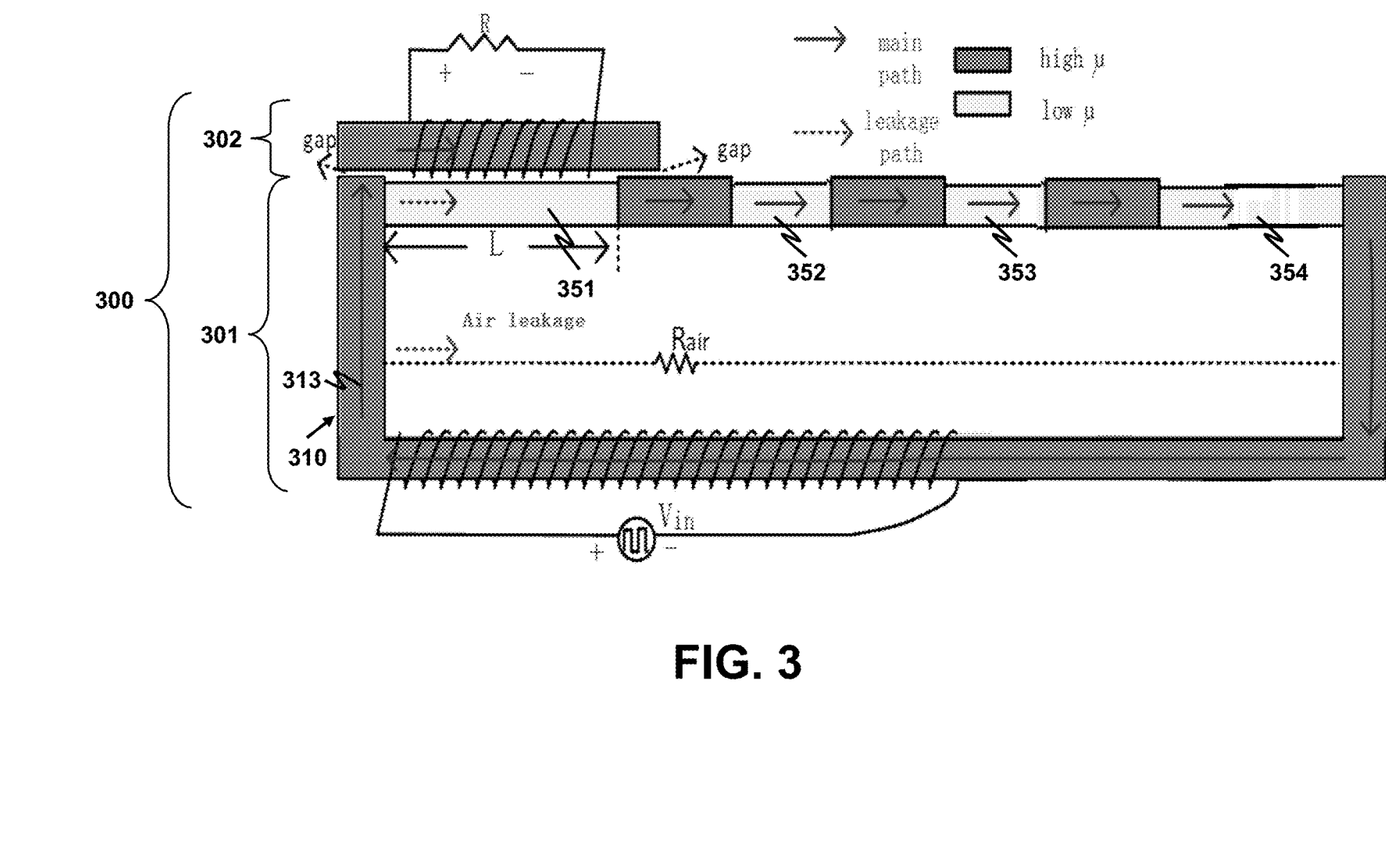

As an example of configuration of the disclosed WPT system, FIG. 3 depicts a WPT system 300 having a power-transmitting unit 301 equipped with four LP core sections 351-354. It follows that there are four ports available for a power-receiving unit 302 to park on. Additionally, the power-transmitting unit 301 may be used to wirelessly transmit power to two to four separate power-receiving units simultaneously. Note that the magnetic flux 313 in the magnetic core 310 of the power-transmitting unit 301 is not reduced even if any additional core sections are inserted. Anyway, the pickup energy received by any power-receiving unit is reduced when the magnetic core 310 is long because the core loss increases.

Figure 4:
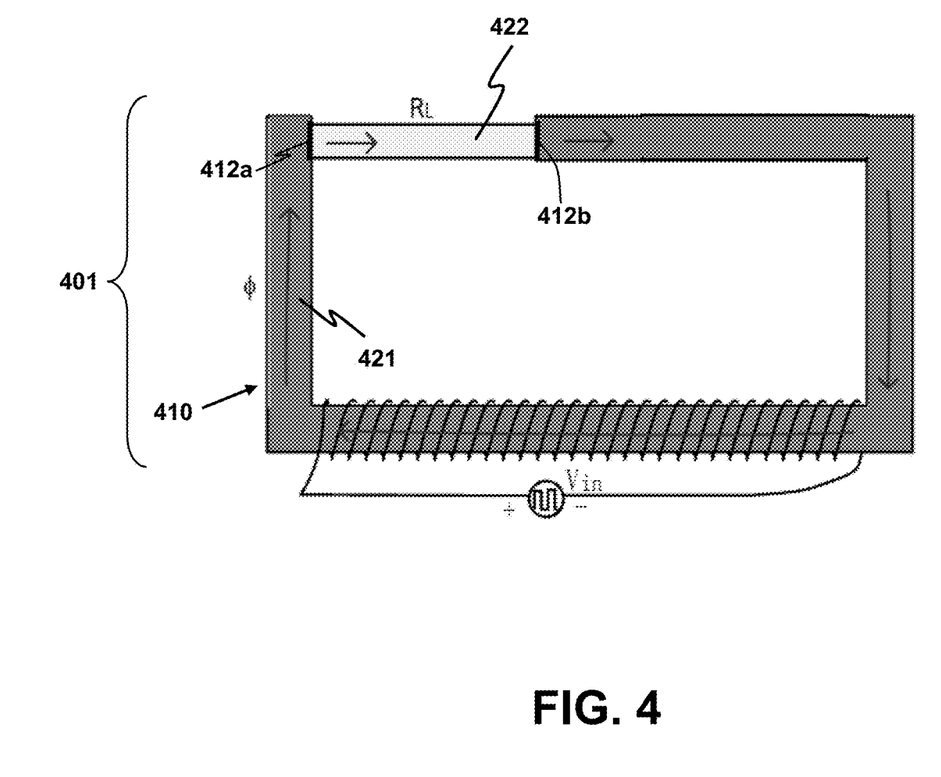
FIG. 4 depicts, as another embodiment of the present invention, a power-transmitting unit having a magnetic core formed by a single LP core section and a single HP core section.

As another example of configuration, FIG. 4 depicts a power-transmitting unit 401 having a magnetic core 410 where the magnetic core 410 is formed by end-to-end connecting a single HP core section 421 to a single LP core section 422 to form a loop. Note that the LP core section 422 connects to a first connecting surface 412a and a second connecting surface 412b, where the first and second connecting surfaces 412a, 412b are of the HP core section 421.

Figure 5:
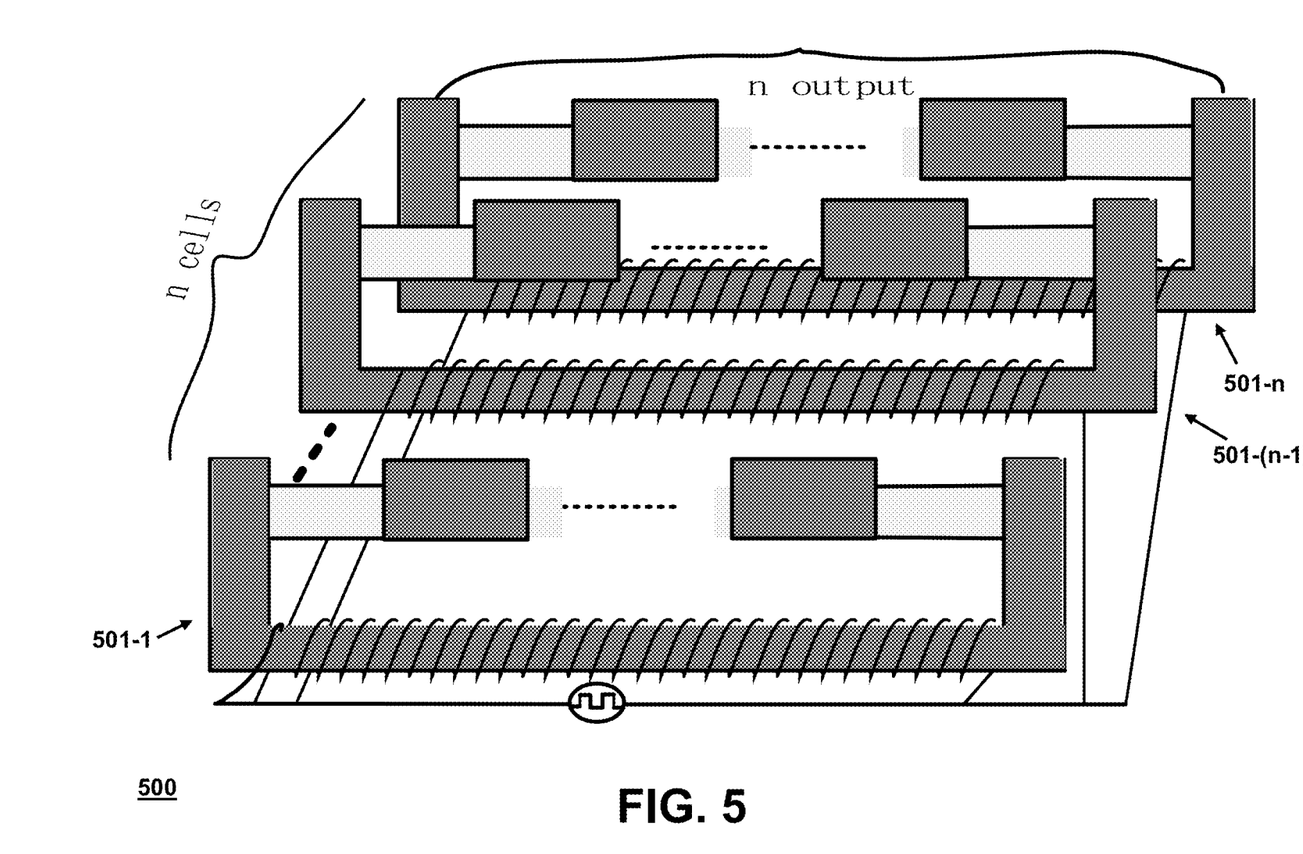
FIG. 5 depicts, in accordance with one embodiment of the present invention, a WPT system comprising plural power-transmitting units for providing a large pickup in current or electrical power.

In one embodiment, plural power-transmitting units are installed in a WPT system such that a large pickup of current or electrical power for a power-receiving unit is obtainable. FIG. 5 depicts, in accordance with this embodiment of the present invention, a WPT system 500 installed with n power-transmitting units 501-1:n, where n>1. For simplicity, a power-receiving unit is not shown in FIG. 5. By having a plurality of power-transmitting units 501-1:n, each power-transmitting unit provides a certain amount of current or electrical power to the power-receiving unit. Aggregating respective amounts of current or electrical power, the power-receiving unit is capable to obtain a large amount of current or electrical power for driving a load. As a result, the power-provision capability of the WPT system 500, or the power transfer rate thereof, is increased as n increases, facilitating high-power transfer. According to the present embodiment, each of the n power-transmitting units 501-1:n is realized as an independent power-transmitting unit according to any embodiment of the WPT system as disclosed above. As one example for illustration, each of the n power-transmitting units 501-1:n is installed with n output ports for WPT.

Although FIG. 1 depicts that the system 100 has one power-receiving unit (i.e. the power-receiving unit 102), it is possible that the disclosed WPT system includes a plurality of power-receiving units. Each of the power-receiving units may be realized as an independent power-receiving unit according to any embodiment of the WPT system as disclosed above.

Other operational aspects of the disclosed WPT system are provided as follows.

Refer to FIG. 1. The primary coil 115, which is wound on the magnetic core 110, may be wound on a predetermined HP core section selected from the set of the HP core sections 111a, 111c, or a certain LP core section selected from the set of the LP core sections 111b, 111d. Preferably, the primary coil 115 is wound on the predetermined HP core section (e.g., the HP core section 111a as shown in FIG. 1) since each LP core section may be more advantageously used as an electrical-power output port for the power-receiving unit 102 to park on.

The shape of the magnetic core 110 can be square, circular or of another shape provided that such shape can conduct magnetic flux.

Each of the core sections 111a-d is essentially made up of one or more magnetic materials, such as ferrite, a magnetic composite, powdered iron or a material exhibiting magnet properties. Those skilled in the art will appreciate that each of the core sections 111a-d may be additionally encapsulated by protection materials, such as an insulating film for preventing an individual core section, which may be electrically conductive, from accidentally contacting the AC power source 105.

The relative permeability of the HP core sections 111a, 111c is usually at least 400, and is preferably from 500 to 5000 or even higher. The relative permeability of the LP core sections 111b, 111d is usually selected to be at most 500, and may be selected to be within a range of 5 to 200.

The relative permeability of the pickup core 150 may also be selected to be the same as the relative permeability of the HP core sections 111a, 111c. It is implementable by fabricating the HP core sections 111a, 111c and the pickup core 150 with the same material.

In one embodiment, the LP core sections 111b, 111d are identical LP core sections in the sense that the two LP core sections 111b, 111d are the same in dimension and in shape. Since the pickup core 150 is shaped and dimensioned according to the LP core section 111b, it follows that the pickup core 150 is enabled to park on any one of the LP core sections 111b, 111d for wirelessly receiving electrical power from the AC power source 105.

Usually, a wire used in forming the primary coil 115 and/or the secondary pickup coil 155 is made of copper. Other conductor may also be used for the wire.

The number of turns of the primary coil 115 may be selected according to an output power intended to be delivered to the load 195. As a general rule, the higher the current in the primary coil 115 and the higher the number of turns, the higher the magnetic flux 113 that is generated so as to provide a higher output power.

Generally, the power-transmitting unit 101 and the power-receiving unit 102 are manufactured to be physically disjoint, but it is possible in certain applications, e.g., educational applications involving toys, the two units may be integrated.

In performing WPT by positioning the pickup core 150 to overlie the LP core section 111b and to partially overlap the two HP core sections 111a, 111c, the LP core section 111b may be separated from the pickup core 150 by the air gap 120 of length between 0.05 mm to 3 cm, or of length within 0.1% to 10% of a length of the pickup core 150.

According to one embodiment of the present invention, the AC power source 105 is included in the system 100. The AC power source 105 is used to supply a high frequency signal to excite the primary coil 115 to thereby generate the magnetic flux 113 in the magnetic core 110. Preferably, the working frequency of the AC power source 105 is set to 20 kHz or above in order to ensure that the working frequency is beyond the normal audible range of human beings. The signal can be a sine wave or a square wave, or any other AC signal considered appropriate for practical situations by those skilled in the art. In case of using the square wave, it may be generated by a power electronics switching circuit. The duty cycle of the square wave is usually set to be 50% for avoiding saturation of the magnetic core 110.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A wireless power transfer (WPT) system comprising at least one power-transmitting unit and at least one power-receiving unit, an individual power-transmitting unit comprising:
    a loop-shaped magnetic core comprising one or more high-permeability (HP) core sections and one or more low-permeability (LP) core sections, the one or more HP core sections having a relative permeability higher than a relative permeability of the one or more LP core sections, all the HP and LP core sections being alternately arranged to form an interleaving pattern in forming the magnetic core; and
    a primary coil wound on the magnetic core for generating a magnetic flux in the magnetic core upon the primary coil being excited by an alternating current (AC) power source;
    an individual power-receiving unit comprising:
        a pickup core configured to overlie a first LP core section selected from the one or more LP core sections, the first LP core section connecting to two connecting surfaces of respective one or two HP core sections immediately adjacent to the first LP core section, the pickup core being further configured to partially overlap said respective one or two HP core sections around the two connecting surfaces, the pickup core having a relative permeability higher than the relative permeability of the first LP core section so as to cause at least a part of the magnetic flux to divert from the first LP core section to the pickup core when the individual power-receiving unit is parked adjacent to the individual power-transmitting unit such that the pickup core overlies the first LP core section and partially overlaps said respective one or two HP core sections; and
        a secondary pickup coil wound on the pickup core for inductively generating electrical power from the diverted part of magnetic flux, enabling electrical power supplied by the AC power source to be wirelessly delivered to the individual power-receiving unit.

2. The WPT system of claim 1, wherein the primary coil is wound on a predetermined HP core section selected from the one or more HP core sections.

3. The WPT system of claim 1, wherein the primary coil is wound on a predetermined LP core section selected from the one or more LP core sections.

4. The WPT system of claim 1, wherein:
    the one or more LP core sections consist of plural identical LP core sections; and
    the first LP core section is selected to be any one of the identical LP core sections such that the pickup core of the individual power-receiving unit is enabled to park on any one of the identical LP core sections for wirelessly receiving electrical power from the AC power source.

5. The WPT system of claim 1, wherein the relative permeability of an individual HP core section is at least 400.

6. The WPT system of claim 5, wherein the relative permeability of the individual HP core section is in a range of 500 to 5000.

7. The WPT system of claim 5, wherein the relative permeability of the individual HP core section is at least 500.

8. The WPT system of claim 1, wherein the relative permeability of an individual LP core section is at most 500.

9. The WPT system of claim 8, wherein the relative permeability of the individual LP core section is in a range of 5 to 200.

10. The WPT system of claim 1, wherein the primary coil is made of copper.

11. The WPT system of claim 1 further comprising the AC power source.

12. The WPT system of claim 11, wherein the AC power source is configured to supply a sine wave to the primary coil.

13. The WPT system of claim 11, wherein the AC power source is configured to supply a square wave to the primary coil.

14. The WPT system of claim 11, wherein the AC power source has a working frequency of 20 kHz or above.

15. The WPT system of claim 1, wherein the first LP core section is separated from the pickup core by an air gap of length between 0.05 mm to 3 cm when the pickup core overlies the first LP core section and partially overlaps said respective one or two HP core sections.

16. The WPT system of claim 1, wherein the first LP core section is separated from the pickup core by an air gap of length within 0.1% to 10% of a length of the pickup core when the pickup core overlies the first LP core section and partially overlaps said respective one or two HP core sections.

17. A wireless power transfer (WPT) system comprising at least one power-transmitting unit and at least one power-receiving unit, an individual power-transmitting unit comprising:
    a loop-shaped magnetic core comprising plural high-permeability (HP) core sections and plural low-permeability (LP) core sections, the HP core sections having a relative permeability higher than a relative permeability of the LP core sections, all the HP and LP core sections being alternately arranged to form an interleaving pattern in forming the magnetic core; and
    a primary coil wound on the magnetic core for generating a magnetic flux in the magnetic core upon the primary coil being excited by an alternating current (AC) power source;
an individual power-receiving unit comprising:
    a pickup core configured to overlie a first LP core section selected from the LP core sections and to partially overlap two HP core sections immediately adjacent to the first LP core section, the pickup core having a relative permeability higher than the relative permeability of the first LP core section so as to cause at least a part of the magnetic flux to divert from the first LP core section to the pickup core when the individual power-receiving unit is parked adjacent to the individual power-transmitting unit such that the pickup core overlies the first LP core section and partially overlaps the two immediately-adjacent HP core sections; and a secondary pickup coil wound on the pickup core for inductively generating electrical power from the diverted part of magnetic flux, enabling electrical power supplied by the AC power source to be wirelessly delivered to the individual power-receiving unit.

18. The WPT system of claim 17, wherein:

the LP core sections are identical; and the first LP core section is selected to be any one of the identical LP core sections such that the pickup core of the individual power-receiving unit is enabled to park on any one of the identical LP core sections for wirelessly receiving electrical power from the AC power source.

* * * * *